UNITED STATES PATENT OFFICE.

HARRY B. BREHAUT, OF COTTAGE GROVE, OREGON.

CARBONATED LIQUID.

No. 879,031.     Specification of Letters Patent.     Patented Feb. 11, 1908.

Application filed April 23, 1906. Serial No. 313,326.

*To all whom it may concern:*

Be it known that I, HARRY B. BREHAUT, a subject of Great Britain, (King Edward VII,) who have declared my intention of becoming a citizen of the United States, residing at Cottage Grove, county of Lane, and State of Oregon, have invented certain new and useful Improvements in Carbonated Liquids, of which the following is a specification.

This invention relates to carbonated liquids for use, more particularly, at soda fountains and on fruits or fancy drinks of all kinds.

The object of the invention is the provision of a carbonated liquid consisting of a novel combination of certain wholesome ingredients in such proportions as will carbonate or give off a gas which causes the entire beverage, through chemical change, to cream on exposure to the air, thereby providing a refreshing and palatable liquid which is ready for immediate use. The carbonated liquid is intended to be contained in siphons and similar vessels for use at soda fountains and also on fruits or fancy drinks of all kinds.

The invention is carried out by the employment of the following ingredients, combined in the following proportions, viz., for a siphon for a 28 oz. capacity, to 4 oz. of water will be added 16 oz. of simple syrup; one oz. of glycerin; one oz. of the desired fruit acid contained in citric acid crystals obtained from limes and lemons; one oz. of bicarbonate of soda (baking soda), and the white of one egg. This mixture will be flavored and colored to suit. The liquid may be made up in larger quantities in the same general proportions of the ingredients as above indicated. When the liquid is mixed in the siphon or other vessel, it presents a clear appearance, but upon agitation or shaking, it becomes creamy and likewise it creams instantly on exposure to the air. The liquid will have a clear appearance of the particular color which is used and all colors may be employed. Owing to the density of the liquid in the siphon due to the compression of gas evolved by neutralizing the acid by the bicarbonate of soda, the air is entirely eliminated and hence, when the liquid is exposed to the air, the gas is liberated and replaced by the air which causes the liquid to immediately transform into a creamy substance.

Having thus described my invention, what I claim as new and desire to secure by Letters Patent is:

1. The process of making a carbonated liquid which consists in adding a bicarbonate to a mixture of simple syrup, glycerin, fruit acid and albumen and sealing the same in a container after the carbon dioxid has been sufficiently liberated to drive atmospheric air out of the container, whereby the bottled liquid will be in condition to liberate a creamy mass when a restricted outlet is formed in the container.

2. A carbonated liquid composed of the following ingredients, viz.: simple syrup, glycerin, fruit acid, bicarbonate of soda, and albumen in substantially the proportions specified, being a liquid when confined under the pressure of the evolved gas and transforming into a creamy consistency when the gas is liberated and air admitted.

In testimony whereof, I hereunto affix my signature in presence of two witnesses.

HARRY B. BREHAUT.

Witnesses:
    ANDY WELSON,
    CHESTER A. VAN DENBERG.